(12) United States Patent
Ho

(10) Patent No.: US 6,374,541 B1
(45) Date of Patent: *Apr. 23, 2002

(54) SPILL-RESISTANT CONTAINER FOR LIQUIDS

(76) Inventor: I-Chung Ho, 6958 Grovespring Dr., Rancho Palos Verdes, CA (US) 90275

(*) Notice: Subject to any disclaimer, the term of this patent is extended or adjusted under 35 U.S.C. 154(b) by 0 days.

This patent is subject to a terminal disclaimer.

(21) Appl. No.: 09/572,001

(22) Filed: May 15, 2000

Related U.S. Application Data

(60) Continuation of application No. 09/250,791, filed on Feb. 17, 1999, now Pat. No. 6,098,850, which is a division of application No. 08/873,070, filed on Jun. 11, 1997, now Pat. No. 5,934,017.

(51) Int. Cl.$^7$ ............................................... A01G 25/00
(52) U.S. Cl. ..................... 47/79; 222/185.1; 222/575; 222/566; 222/568; 215/400; 425/813
(58) Field of Search ............................ 222/185.1, 575, 222/566, 568; 47/79; 215/400; 425/813; D7/312; 119/72.5, 72, 77, 51.5

(56) References Cited

U.S. PATENT DOCUMENTS

| | | | |
|---|---|---|---|
| 236,997 A | 1/1881 | Dodge | 222/456 |
| 570,759 A | 11/1896 | Law | 222/456 |
| 836,466 A | 11/1906 | Sears | 222/456 |
| 3,902,652 A | 9/1975 | Malcolm | 222/566 X |
| 4,073,397 A * | 2/1978 | Snodgrass | 215/1 |
| D270,518 S | 9/1983 | Duering | D9/317 |
| 4,437,587 A | 3/1984 | Duering | 222/207 |
| 4,491,245 A | 1/1985 | Jamison | 222/575 X |
| D288,334 S | 2/1987 | Simons | D16/32 |
| D288,889 S | 3/1987 | Mantani | D7/312 |
| 4,935,283 A | 6/1990 | Jamison | 428/174 |
| 5,067,501 A | 11/1991 | Auger | 132/116 |
| 5,217,696 A | 6/1993 | Wolverton et al. | 422/121 |
| 5,269,094 A | 12/1993 | Wolverton et al. | 47/79 |
| D348,802 S | 7/1994 | Miller, III | D7/510 |
| 5,351,438 A | 10/1994 | Wolverton et al. | 47/49 |
| 5,356,053 A | 10/1994 | Di Fatta | 222/456 |
| 5,433,923 A | 7/1995 | Wolverton et al. | 422/121 |

FOREIGN PATENT DOCUMENTS

JP 402092318 A * 4/1990 ............ A47J/31/06

* cited by examiner

Primary Examiner—Peter M. Poon
Assistant Examiner—Andrea M. Valenti

(57) ABSTRACT

A spill-resistant container for storing and dispensing a liquid, the container having a curved neck which prevents the liquid from spilling when being poured out of the opening of the container. For example, the spill-resistant container may have a curved neck in the form of a number "7", a letter "Z" or a letter "S". When the spill-resistant container that is full of liquid is tilted such that the liquid level inside the container is higher than the liquid level at the opening of the container, no liquid flows out of the container. The liquid will start to flow out of the container only after the container is tilted beyond a predetermined start-to-pour angle. The start-to-pour angle is reached when the container is tilted enough so that the outside air starts to enter the container and the liquid inside the container starts to flow out of the container. This design makes pouring a liquid from a full container much less likely to spill.

32 Claims, 6 Drawing Sheets

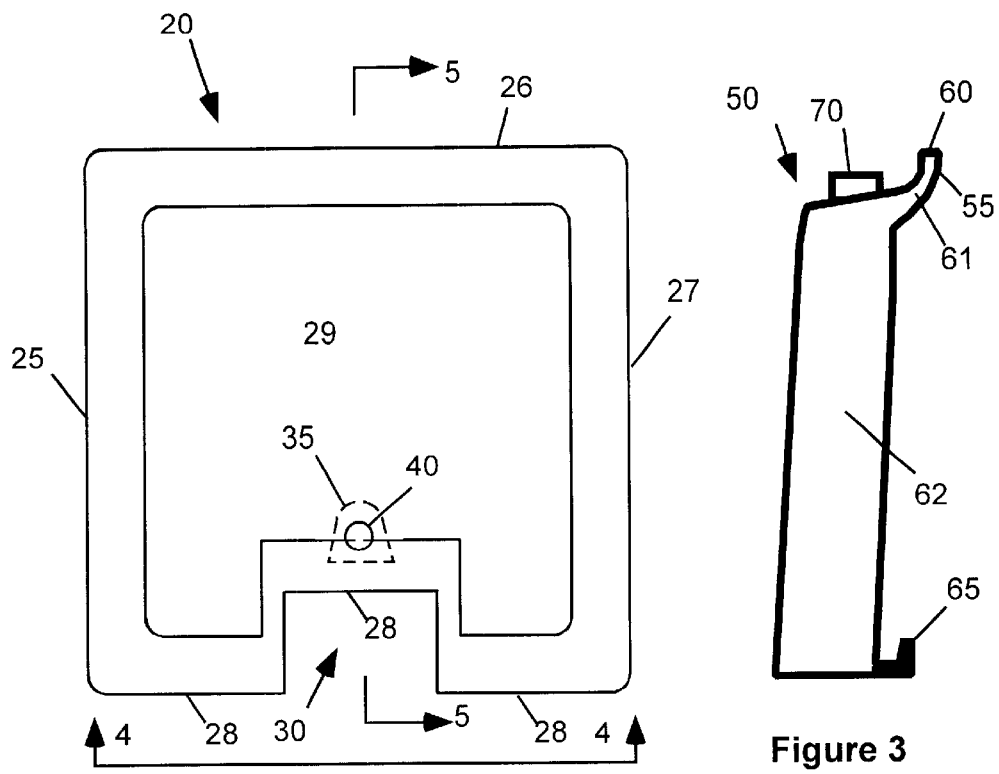
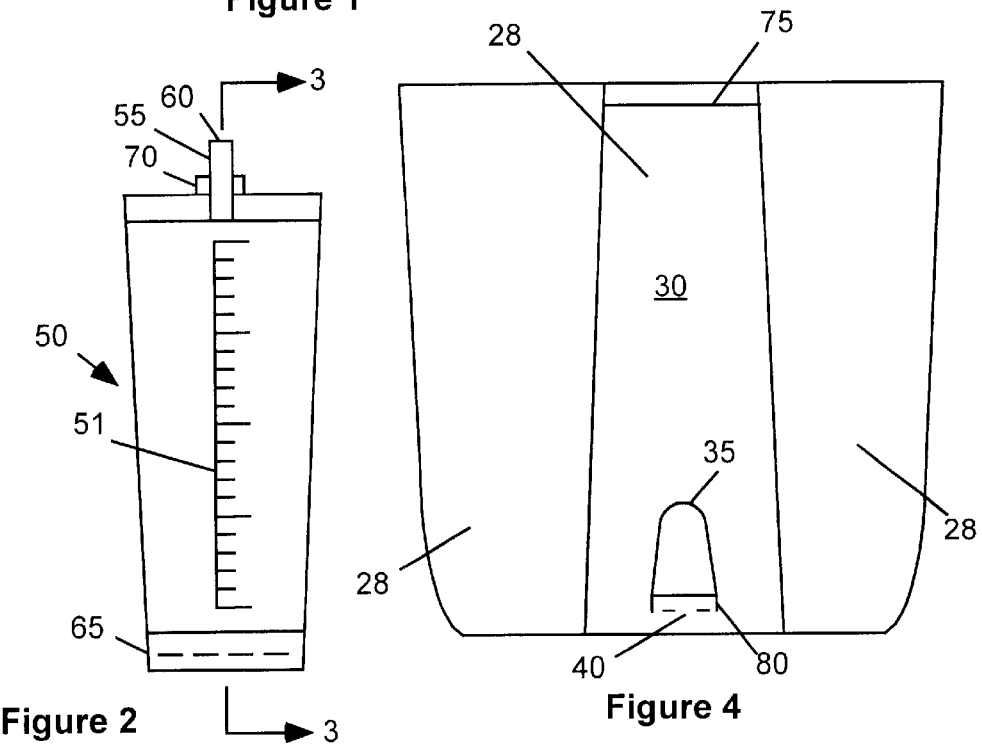
Figure 1
Figure 3
Figure 2
Figure 4

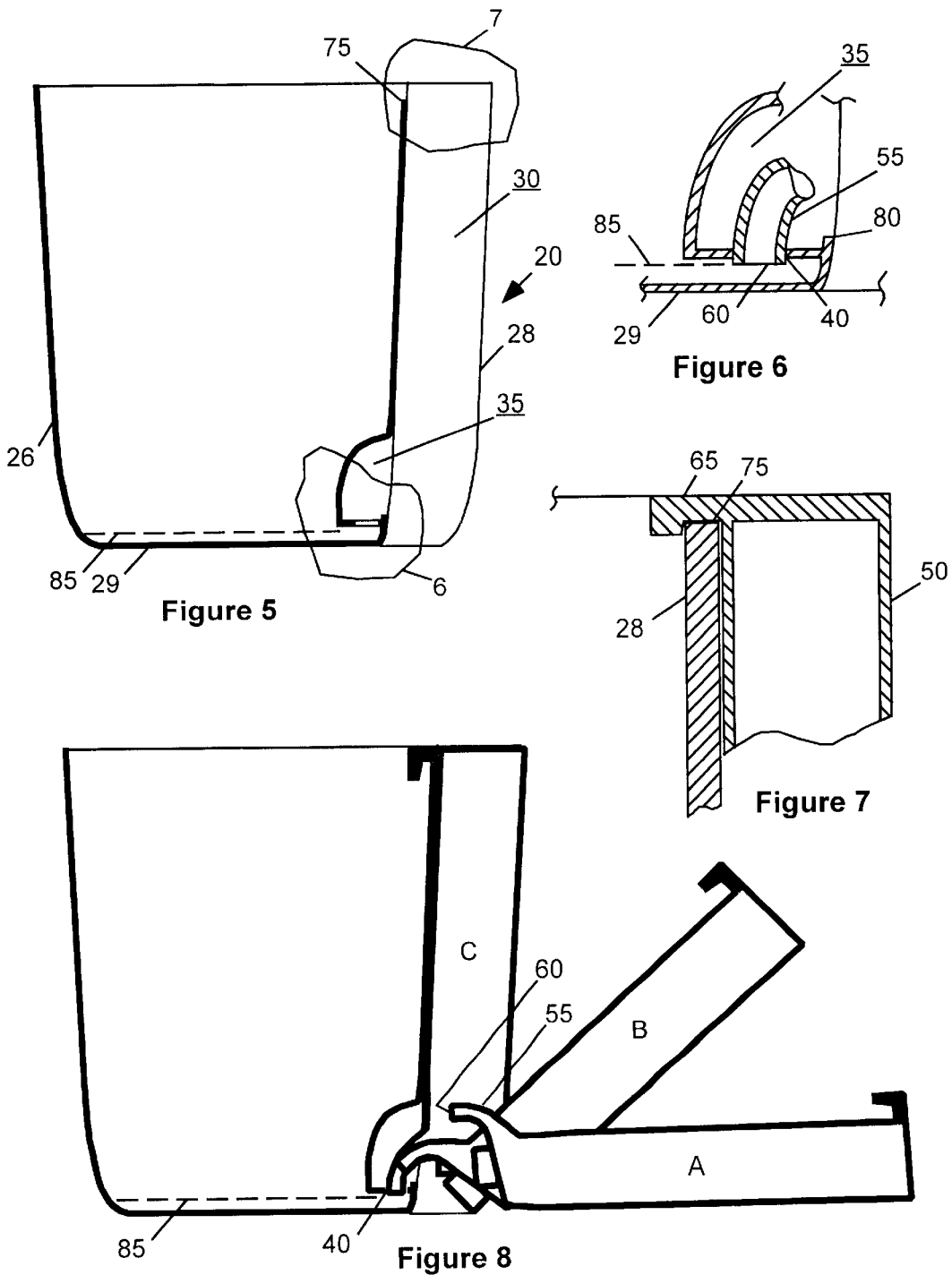

SPILL-RESISTANT CONTAINER FOR LIQUIDS

This is a continuation of U.S. patent application Ser. No. 09/250,791, filed on Feb. 17, 1999, now U.S. Pat. No. 6,098,850 which is a divisional of U.S. patent application Ser. No. 08/873,070, filed on Jun. 11, 1997, now U.S. Pat. No. 5,934,017.

BACKGROUND OF THE INVENTION

It is well known that plants need air, water, and light for growth. It is also known that plants purify air. The purification of air through plant leaves is well known. However, the role of complex biological and bacterial process of plant's root system in breaking down air polluting chemicals and suppressing the growth of microbes has only become understood in recent years.

Since the energy crisis in the 1970's, new homes are being built with energy efficiency in mind. To achieve this, buildings tend to have less air circulation with the outside air and better seal around doors and windows. As a result of these changes in addition to wide spread use of plastics, paints and other synthetic materials and chemicals, the indoor air pollution have become a serious health problem, which resulted in the so called sick air syndrome. Several air purification planters and apparatus were proposed by U.S. patents such as U.S. Pat. Nos. 5,217,696; 5,269,094; 5,351,438; and 5,433,923. These patents suggest means to improve the interaction of air with the root system of the plants. A major deficit of these designs include 1) lack of sufficient water reservoir in the planter which increases the work of maintaining the plants, 2) relatively large variation of water level within the planter which is, in many respects, an undesirable consequence of being unable to control a constant water level in the planter.

On the market everywhere, there are many kinds of the so called "self watering" planters available to the public. There are very little difference among these planters. The basic feature of these "self watering" planters is that a small water reservoir at the bottom of the planter with a water filling opening near the bottom of the planter side wall. A perforated divider separates soil from the water reservoir except that there are few studs or channels in the divider which extend down into the water reservoir and all the way to the bottom of the planter so that soil in these studs or channels were able to be submerged in the water at any given water level in the water reservoir. Capillary action of the soil is able to lift water to the root system and support plant growth. The disadvantages of these "self watering" planters include 1) the size of the water reservoir is usually small and the uncontrollable water level also changes with time, 2) the bottom exposed portion of the soil and the water reservoir are directly open to the ambient air through the water refill opening and thus mildew or microbe growth is a common problem.

This invention relates to a planter with a removable water reservoir/liquid bottle which is capable of maintaining a constant water level in the planter. Because the water reservoir/liquid bottle is exterior to the planter and removable for refill, the size of the water reservoir/liquid bottle may be made as big as one wishes. The neck of the water reservoir/liquid bottle mouth "plugs" into the opening of the planter thus closes off the direct contact of water and potting medium in the container with the ambient air and thus reduced or eliminated the problem of mildew around water in the planter.

With different optional inserts, the interface areas of ambient air with the potting medium and the root system is maximized, thus enhancing the effectiveness of air purification process by the root system. A lamp and circulation fan are also provided. The location of the fan is imbedded within the potting medium and the water in the planter thus greatly reducing the vibration and noise level of the fan.

When inserting a full bottle of water to a drinking fountain stand, pouring a can of motor oil to the engine, pouring anti-freeze liquid into the radiator and in many other occasions, the liquid in the bottle is often too full and the receptacle spot has too small of an opening. Under these circumstances, one must act quickly or very often will spill the liquid all over the place. The extended curved neck of the liquid bottle of this invention allows the bottle to be laid flat without spilling. The extended curved neck design even allows the user to raise the bottom of the bottle such that the liquid level inside the liquid bottle is higher than its mouth opening without spilling. This special feature makes the insertion and removal of water bottle from a drinking fountain extremely easy. In fact, this design simply makes the pouring of liquid from a container much more manageable with less chance of spilling.

SUMMARY OF THE INVENTION

It is an object of the present invention to provide an improved planter for plants.

It is another object of the present invention to provide a removable and refillable water reservoir/liquid bottle for the planter. The removable water reservoir/liquid bottle is made of transparent material or with a strip of see through window so that the water level in the water reservoir/liquid bottle is in clear view.

It is another object of the present invention to provide and maintain a constant water level in the planter.

It is another object of the present invention to increase the interface surface areas between ambient air with the potting medium and the root system. The improved air circulation and the inclusion of a lamp are all means of improving the effectiveness of air purification and sterilization.

It is yet another object of the present invention to provide an improved water reservoir/liquid bottle such that it is easier to turn over for inserting into the planter, water fountain or other applications or just for pouring a liquid without a concern for spilling.

The present invention includes an improved planter with a small opening near the bottom of the planter. A water reservoir/liquid bottle with an extended curved neck can be "plugged" into the opening of the planter and closes off the direct contact of water and potting medium in the planter with the ambient air. A constant level of water is maintained inside the planter. This constant water level is achieved by the upside down water reservoir/liquid bottle and the partial vacuum created within the water reservoir/liquid bottle.

Three different version of optional inserts may be placed inside the planter. Each one serves different purposes and with different complexity. The simplest insert will help to increase the interface areas of ambient air with the potting medium and the root system thus improving the breathing or circulation of air in the root system and enhancing the air purification process by the root system. The second insert includes a circulation fan such that the circulation of air is greatly increased. The third insert includes a lamp with or without a circulation fan. The lamp using either incandescent bulb or bulb with ultra violet feature will help to disinfect the air being circulated around the bulb. The inclusion of a fan will further enhance the air circulation.

For air purification purpose, hydroponically soil-less planting is the desired approach. Water absorbing pebbles such as expended clay and zeolite with or without activated carbon are ideal potting medium. This type of potting medium often leaves many void air spaces in the potting medium and the root system and allows circulating air to be scrubbed by the wet pebble surfaces and the root system and maximizing the effect of air purification.

Conventional potting soil may also be used in this planter. The air purification property does reduce considerably, nevertheless, it is still better than the regular planter. Other advantages of the planter described earlier still apply.

The extended curved neck design of the water reservoir/liquid bottle provides a unique feature which allows the water reservoir/liquid bottle to be laid flat after filling without spilling any liquid. In fact, the bottom of the water reservoir/liquid bottle can be lifted even higher with the liquid line inside being higher than the opening of the water reservoir/liquid bottle without spilling any liquid. Bottle design with this feature could be applied to, in addition to the disclosed planter as described in this application, bottled water for drinking fountain, motor oil bottle, anti-freeze fluid bottle, cooking oil bottle and many other applications whenever spillage is a concern when the bottle is turned for pouring.

BRIEF DESCRIPTION OF THE DRAWINGS

FIG. 1 is a top view of the planter of the present invention.

FIG. 2 is a top view of the removable water reservoir/liquid bottle of the present invention being laid flat.

FIG. 3 is the cross-sectional view of FIG. 2 along line 3—3.

FIG. 4 is the side view of FIG. 1 in the direction along line 4—4.

FIG. 5 is the cross-sectional view of FIG. 1 along line 5—5.

FIG. 6 is the detailed view of the portion indicated in zone 6 of FIG. 5.

FIG. 7 is the detailed view of the portion indicated in zone 7 of FIG. 5 with the water reservoir/liquid bottle (partially shown) hung on the side wall of the planter.

FIG. 8 shows the same cross-sectional view of FIG. 5 with water reservoir/liquid bottle inserting to the opening of the planter in three progressive positions.

DETAILED DESCRIPTION OF THE INVENTION

Figures 9, 10:
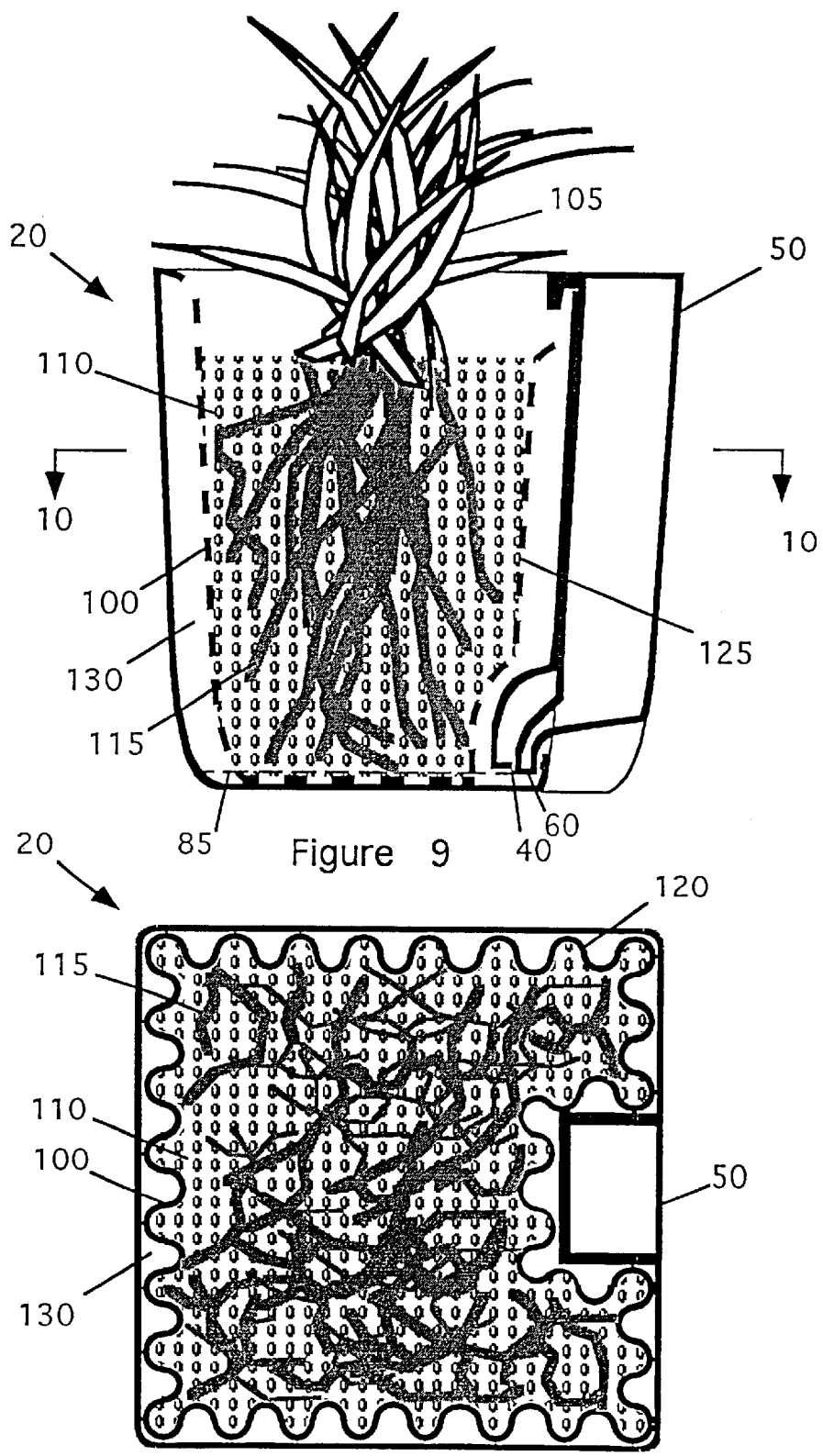
FIG. 9 shows the same cross-sectional view of FIG. 5 with first optional insert and water reservoir/liquid bottle hung in place and plant potted with potting medium.
FIG. 10 shows the cross-sectional view of FIG. 9 along line 10—10.

FIG. 1 shows the top view of the planter 20 of the present invention. Which has four side walls 25, 26, 27, and 28 and a bottom 29. The rectangular shaped planter shown is for example only, many other shapes may also be suitable. One of the side wall 28 has an indentation 30. Near the bottom of the planter at the indentation 30, the side wall 28 has a further cavity 35 (may be seen better in FIGS. 4 and 5 and is partially detailed in FIG. 6). There is an opening 40 at the bottom of the cavity 35. A water reservoir/liquid bottle 50 shown in FIGS. 2 and 3 is shaped to match the indentation 30. FIG. 2 shows the top view of the water reservoir/liquid bottle 50 which is being laid flat. The water reservoir/liquid bottle 50 is made of transparent material or at least a portion of the side wall (the bottom wall as shown in FIG. 2) is transparent and is marked with a scale 51. The amount of water remaining in the water reservoir/liquid bottle 50 will be clearly visible while inserted to the planter. FIG. 3 is the cross-sectional view of the water reservoir/liquid bottle 50 along line 3—3 in FIG. 2. The heavy bold lines shown in FIG. 3 as well as other figures described later represent the thickness of the cross-sectional walls. The water reservoir/liquid bottle 50 has an extended curved neck 55 and a mouth opening 60. A passage way 61 connects the mouth opening to the storage chamber 62 where water is stored. It also has a hanging hook 65, and a refill opening with a cap 70. FIG. 4 is the side view of the planter 20 along line 4—4 in FIG. 1. The indented portion of the side wall 28 has lower side wall at edge 75 where the hanging hook 65 of the water reservoir/liquid bottle 50 will hang. The cavity 35 allows the opening 40 to be further set back into the planter (better seen in FIGS. 5 and 6). This arrangement plus all the side walls of the planter being tilted inward with the bottom of the planter being smaller than the top so that the stacking of planters to save space for shipping and storage becomes possible. A raised edge 80 surround the opening 40 will catch any water spill during the insertion or removal of the water reservoir/liquid bottle 50. FIG. 5 shows the cross-sectional view of the planter along line 5—5 in FIG. 1. A detailed cross-sectional view for the portion of region 6 is shown in FIG. 6. FIG. 6 includes a section of the extended curved neck 55 of the water reservoir/liquid bottle 50 when plugged in place to the planter 20. The tip of the neck 55 fits snug with the opening 40. FIG. 7 is a detailed partial cross-sectional view of the region 7 shown in FIG. 5 with the water reservoir/liquid bottle 50 (only a small portion is shown) already hung on side wall 28 at the lowered edge 75. FIG. 8 is the same cross-sectional view of FIG. 5 showing how the water reservoir/liquid bottle 50 is inserted into the planter 20 with the water reservoir/liquid bottle shown in three progressive positions. When the water reservoir/liquid bottle 50 is filled and the refill cap 70 closed tight, the water reservoir/liquid bottle may be laid flat in position A. The specially designed extended curved neck 55 allows the water reservoir/liquid bottle to be laid flat without spilling any water. In fact, the water reservoir/liquid bottle could be lifted to an angle well beyond position B as shown in FIG. 8 before water will start to flow out. The extended curved neck 55 also allows the mouth opening 60 to be aimed toward the cavity 35 at the opening 40 easily. The insertion of water reservoir/liquid bottle 50 into the planter 20 from position A through position B to the final hung position C becomes easy and less likely that any water will spill outside the planter. Due to a partial vacuum created within the water reservoir/liquid bottle 50, the water level line 85 in the planter will be automatically maintained at the mouth opening 60 of the water reservoir/liquid bottle 50 for as long as there is water remaining in the water reservoir/liquid bottle. The indentation 30 shown in the figures and described in this disclosure is not a necessary feature. The inclusion of this indentation is for better visual appearance of the planter. After the water reservoir/liquid bottle is filled with water and hung to the planter, the water reservoir/liquid bottle fits well with the indentation and the planter appears square again on the outside. If the planter is rectangular in shape, the water reservoir/liquid bottle may very well have the same width of the planter without indentation and still have a pleasant appearance.

FIG. 9 shows the same cross-sectional view of FIG. 5 along line 5—5 in FIG. 1 with water reservoir/liquid bottle 50 inserted. FIG. 9 also shows the first optional insert 100 along with plant 105 potted using potting medium 110. FIG. 10 shows the cross-sectional view along line 10—10 in FIG. 9. The purpose of this insert 100 is to provide a maximized interface areas of ambient air with the potting medium 110 and the root system 115 of the plant 105. It is achieved by utilizing any suitable form of wavy side walls 120 of the insert 100 against the inside surfaces of the planter side walls such that narrow air passage ways 130 are formed. The wavy side walls have small holes or perforations 125 (shown in FIG. 9). These holes allow the breathing of the root system with ambient air in the air passage ways 130. Potting medium 110 fill the insert where the plant 105 is potted. The bottom layers of the potting medium are submerged under the water level line 85. Capillary action along with the suction of the root system 115 carry water to the upper portion of the potting medium and therefore support the plant growth. The tip of the extended curved neck 55 of the water reservoir/liquid bottle 50 closes off the opening 40 in the planter and isolates ambient air from direct contact with the water in the planter. Any contact of air must pass through the potting medium and the root system or through the narrow air passage ways 130. The ability of the root system in suppressing microbe growth in the vicinity of the root system including the air passage ways 130 will help reduce or eliminate mildew growth near the water line 85, which has always been a major problem in the ordinary "self watering" planter. The biological and bacterial processes of the root system along with the increased interface areas with ambient air will greatly enhance the air purification process compared to the same plant growing in an ordinary planter.

Figure 11:
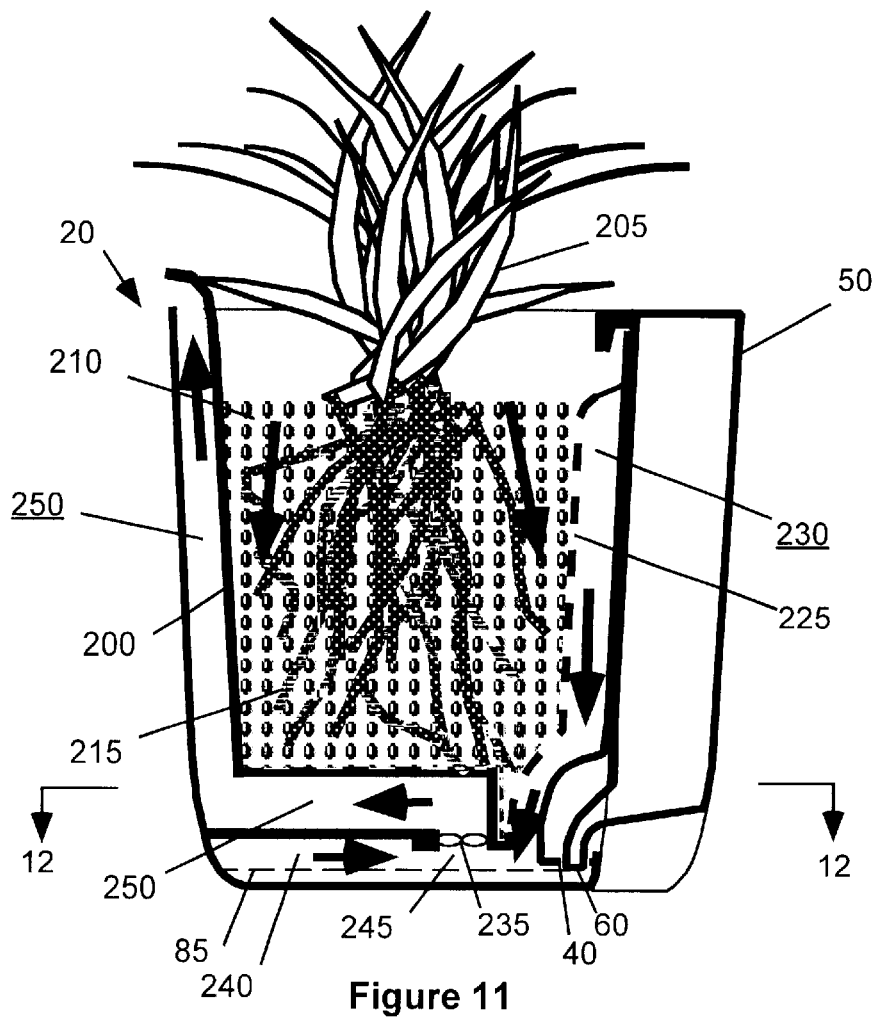
FIG. 11 shows the same cross-sectional view of FIG. 5 with the second optional insert (including fan) and water reservoir/liquid bottle hung in place and plant potted with potting medium.
Figure 12:
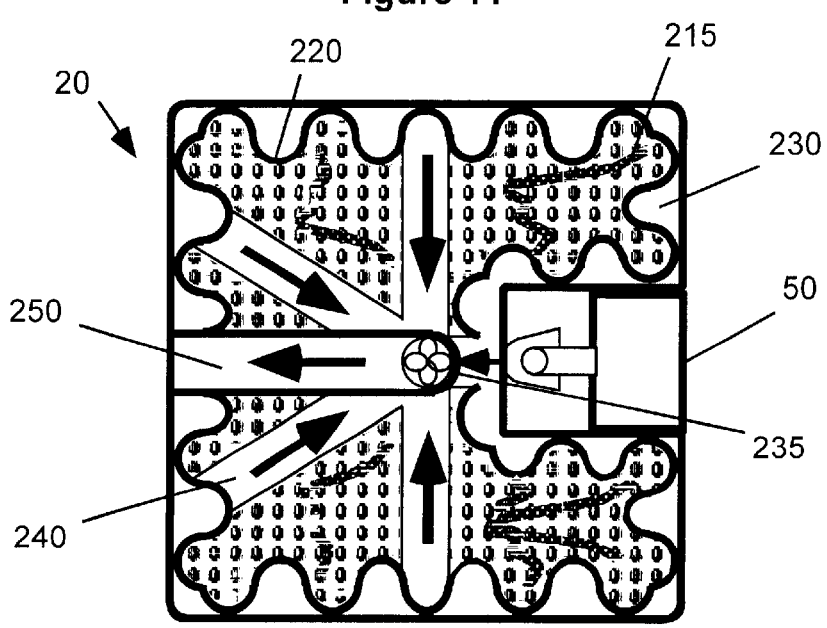
FIG. 12 shows the cross-sectional view of FIG. 11 along line 12—12.

FIG. 11 shows the same cross-sectional view of FIG. 5 along line 5—5 in FIG. 1 with water reservoir/liquid bottle 50 inserted. FIG. 11 also shows the second optional insert 200 along with plant 205 potted using potting medium 210. FIG. 12 shows the cross-sectional view along line 12—12 in FIG. 11. The purpose of this insert 200 is the inclusion of a circulation fan 235 to enhance the air flow in addition to maximize the interface areas of ambient air with the potting medium 210 and the root system 215 of the plant 205. The wavy side walls 220 of the insert 200 against the inside surfaces of the planter side walls formed narrow air passage ways 230. The wavy side walls 220 have small holes or perforations 225 for air to pass through. A circulation fan 235 is located at the bottom center of the insert 200 slightly above the water level line 85. The use of circulation fan helps to increase air flow through the potting medium and the root system. The circulating air is then passed through the small holes or perforations 225 of the insert and down through the air passage ways 230 to the bottom of the planter. Partition walls at the bottom of the insert form air inlet ducting 240, which guide the circulation air toward the suction side 245 of the fan 235. Discharge duct 250 guides the exhaust air to the ambient. Potting medium 210 fills the insert where the plant 205 is potted. The bottom layers of the potting medium are submerged under the water level line 85. Capillary action along with the suction of the root system 215 carries water to the upper portion of the potting medium and therefore support the plant growth.

Figure 13:
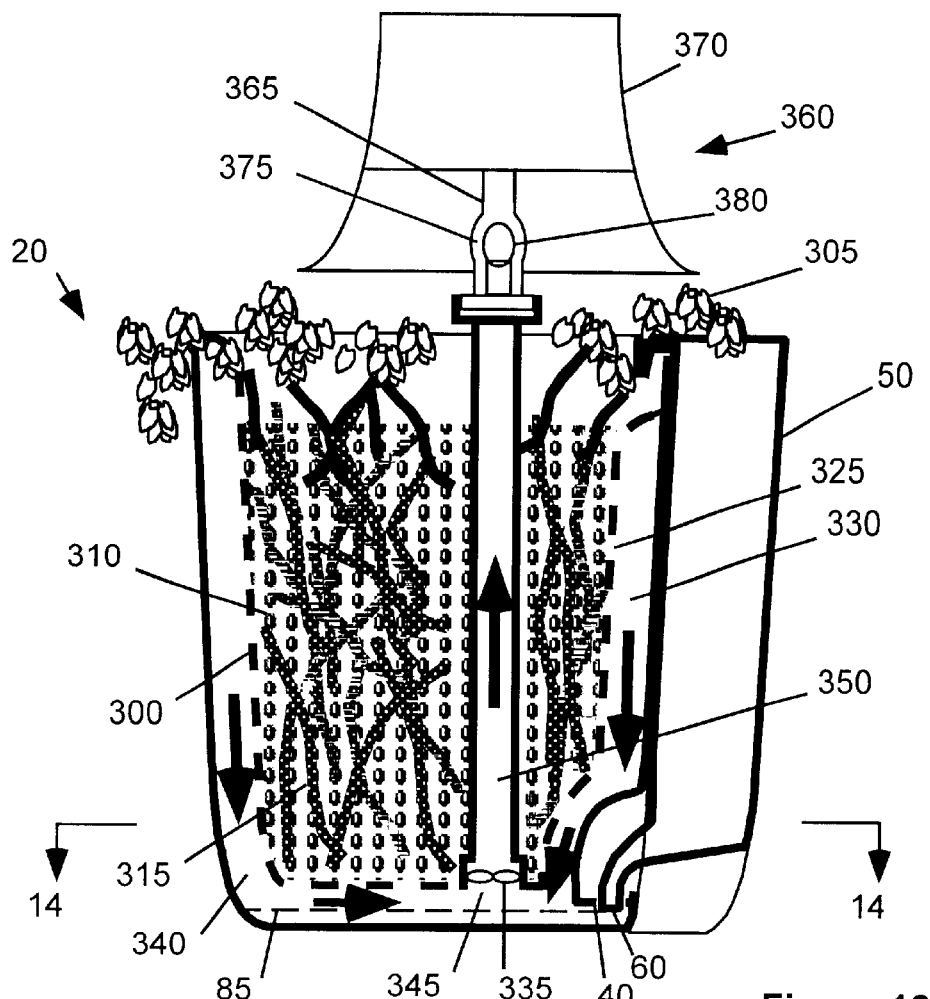
FIG. 13 shows the same cross-sectional view of FIG. 5 with the third optional insert (including lamp and optional fan) and water reservoir/liquid bottle hung in place and plant potted with potting medium.
Figure 14:
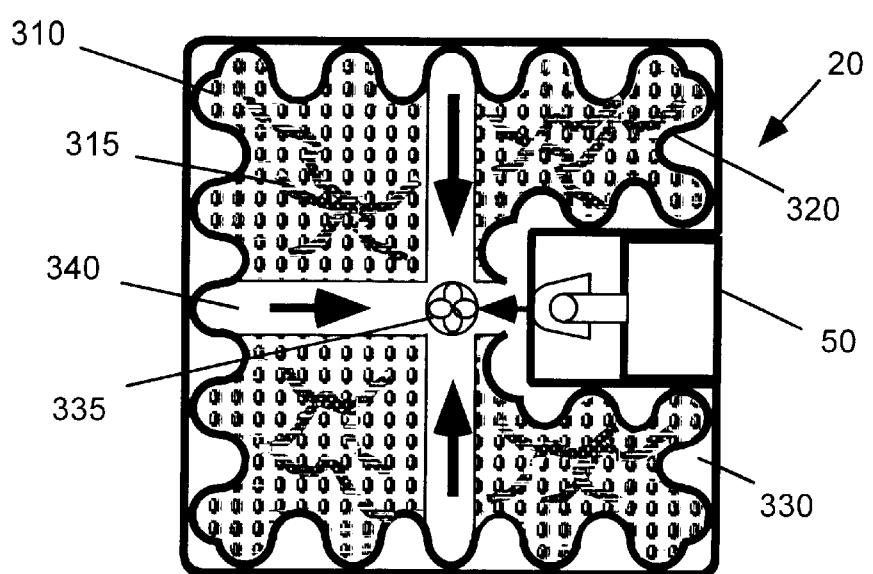
FIG. 14 shows the cross-sectional view of FIG. 13 along line 14—14.

FIG. 13 shows the same cross-sectional view of FIG. 5 along line 5—5 in FIG. 1 with water reservoir/liquid bottle 50 inserted. FIG. 13 also shows the third optional insert 300 along with plants 305 potted using potting medium 310. FIG. 14 shows the cross-sectional view along line 14—14 in FIG. 13. The purpose of this insert 300 is to include a lamp 360 attached to the discharge duct 350 along with a glass shield 365 and a lamp shade 370 in addition to maximize the interface areas of ambient air with the potting medium 310 and the root system 315 of the plants 305. The wavy side walls 320 of the insert 300 against the inside surfaces of the planter side walls form narrow air passage ways 330. The heat of the lamp will heat the air and cause the air to rise and pass through the air gap 375 between light bulb 380 and the glass shield 365. This rise of air creates a suction at the discharge duct 350 which in turn pulls ambient air to pass through potting medium 310 and the root system 315 then through holes or perforations 325 and down the air passage ways 330, the air inlet ducting 340 to the discharge duct 350. An optional circulation fan 335 is located at the bottom of the discharge duct 350 and above the water level line 85. Some enhancement of air circulation by fan is helpful but too much air flow may cause the light bulb 380 being unable to heat the air hot enough for sterilization. Potting medium 310 fills the insert where the plant is potted. The bottom layers of the potting medium submerged under the water level line 85. Capillary action along with the suction of the root system 315 carries water to the upper portion of the potting medium and therefore supports the plant growth.

Figure 15:
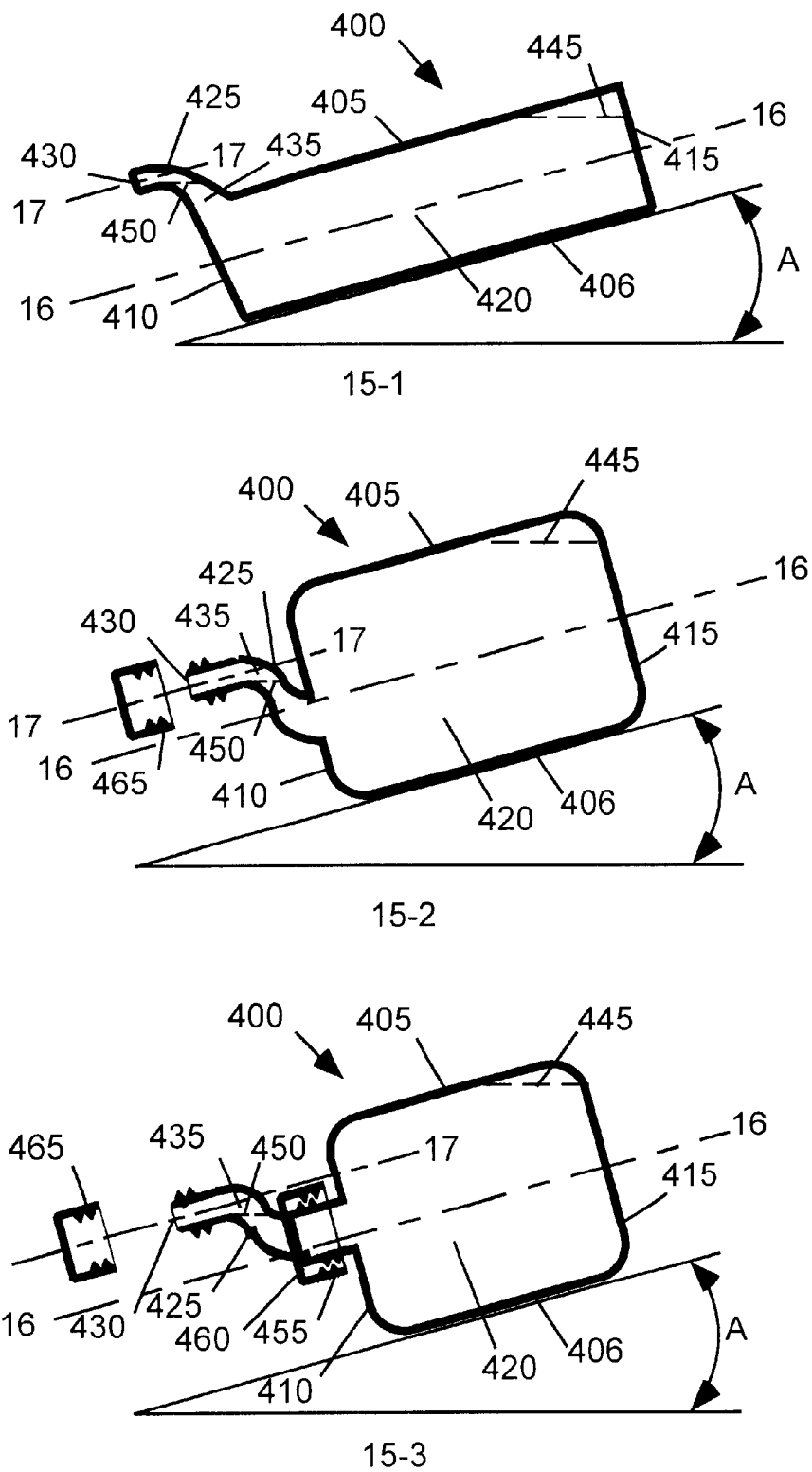
FIG. 15 shows examples of liquid bottle designs with the extended curved neck feature presented in this disclosure which may be used as a refillable water bottle or for many other applications.

FIG. 15 shows examples of various versions of liquid bottle 400 with the extended curved neck feature incorporated into the design. The liquid bottle 400 may be of any shape or size. It generally has side walls 405, top wall 410, and bottom wall 415. If desirable, one side wall 406 may be flat to allow the liquid bottle to lay flat after filling. A major axis 16—16 generally defines the center line of the liquid bottle. The liquid bottle is in its upright position when the major axis is vertical and the top wall 410 is facing up. The extended curved neck 425 could be in the form of a letter "7" (as shown in FIG. 15-1), or in the form of a letter "Z", or "S" (as shown in FIGS. 15-2, 15-3). A mouth opening 430 is located at the end of the extended curved neck. A minor axis 17—17 perpendicular to the plane of the mouth opening. In general, the minor axis 17—17 is parallel with the major axis 16—16. However, it is not necessary to do so, and the two axes may be oriented at a small angle. The extended curved neck 425 may start from almost anywhere on the liquid bottle 400 but usually starts from the top wall 410 or from the side wall near the top wall and on the opposite side of the flat side wall 406. A passage way 435 along the center line of the extended curved neck connects the mouth opening 430 with the inner chamber 420 of the liquid bottle 400.

After the liquid bottle is filled with liquid in the upright position, it can be laid flat on the side wall 406 and the liquid inside the chamber 420 will not flow out even if the liquid level line 445 inside the chamber 420 is higher than the liquid it is oriented correctly with the "7", "Z" or "S" shaped curved neck in the upright position where the mouth opening end of the curved neck is on the upper most location when the liquid bottle is laid down flat before tilting as shown in FIG. 15 with angle A at zero degree. The bottom wall 415 is lifted further to pour the liquid. The liquid will not start to flow until the angle "A" reaches a pouring angle which can be anywhere between zero (0) to nearly ninety (90) degrees. This angle "A" is determined by the shape, size, curvature, and restrictions of the passage way 435. When this angle "A" reaches the pouring angle, outside air will start to enter the liquid bottle at the liquid level line 450 in the extended curved neck 425 and at the same time liquid inside the liquid bottle will start to flow out.

The extended curved neck feature may be built-in with the liquid bottle (as shown in FIGS. 15-1, and 15-2) or built into a cap 455 by then attaching the cap to any existing bottle with a gasket 460 for leak proofing (as shown in FIG. 15-3). Optional closing cap or plug 465 may be used to enclose the liquid bottle mouth opening when the bottle is not in use or during transportation.

Various modifications to the depicted and described apparatus will be apparent to those skilled in the art. Accordingly, the forgoing detailed description of the preferred embodiment should be considered exemplary in nature and not as limiting to the scope and spirit of the invention as set forth in the appended claims.

What is claimed is:

1. A spill-resistant container comprising:
    a body including a top region and a base located opposite the top region, the base being configured to rest on a horizontal surface, the body defining an interior volume in the container for storing a liquid;
    a neck connected to the top region of the body which defines and encloses a bent passageway having a first end and a second end, the bent passageway having a bent centerline;
    a first opening located at the first end of the bent passageway, the first opening coupling the bent passageway to the interior volume of the container;
    an unrestricted second opening located at the second end of the bent passageway, the second opening coupling the bent passageway to the exterior of the container and being sufficiently large to permit the pouring of the liquid out of the container;
    a first bend defined by the bent passageway and located between the first end and second end of the bent passageway, the first bend having an apex and the distance between the base and a point of the bent centerline of the bent passageway increasing or remaining the same as the point travels from the first opening to the apex of the first bend;
    wherein the bent passageway is configured to determine a start-to-pour angle between the base and the horizontal surface at which outside air starts to enter the interior volume of the container and the liquid inside the container starts to flow out of the second opening of the bent passageway, and if the container is tilted less than the start-to-pour angle, outside air can not enter the interior volume of the container and the liquid does not pour out of the second opening of the bent passageway even if the distance between the level of the liquid inside the container and the horizontal surface is greater than the distance between the apex of the first bend and the horizontal surface;
    where the start-to-pour angle is greater than 45 degrees and less than 180 degrees.

2. The spill-resistant container of claim 1 wherein the first bend is a curve having a radius.

3. The spill-resistant container of claim 1 wherein the first bend is an angled junction between two arcs, or two straight sections.

4. The spill-resistant container of claim 1 wherein the body forms a rectangularly shaped container.

5. The spill-resistant container of claim 1 wherein the body forms a spherically, elliptically, or other irregularly shaped container.

6. The spill-resistant container of claim 1 wherein the container is semi-rigid.

7. The spill-resistant container of claim 1 wherein the start-to-pour angle is between approximately 90 degrees and 180 degrees, but less than 180 degrees.

8. The spill-resistant container of claim 1 wherein the start-to-pour angle is approximately 90 degrees.

9. The spill-resistant container of claim 1 wherein as the container is tilted and the liquid starts to pour from the body, a partial vacuum is created inside the container which establishes the start-to-pour angle at which outside air begins to enter the interior volume of the container and the liquid starts to flow out of the second opening of the bent passageway.

10. The spill-resistant container of claim 1 wherein the bent passageway includes a second bend located between the first bend and the first opening.

11. The spill-resistant container of claim 10 wherein the bent passageway defines a bent centerline inside the bent passageway extending from the first opening through the first and second bends and to the second opening, the distance between a point of the bent centerline and the base increasing or being equal as the point travels from the first opening to the second opening.

12. The spill-resistant container of claim 1 wherein at least a portion of the neck is detachable from the container.

13. A semi-resistant container for a liquid comprising:
    a body having a base and a first axis that intersects the base, the body defining an interior volume about the first axis for storing a liquid such that the container has an upright position when the base is parallel to a horizontal surface and the container has a start-to-pour position when the base is rotated to a start-to-pour angle relative to the horizontal surface;
    a neck located at a first portion of the body and defining a curved passageway having a first end and a second end;
    a first opening located at the first end of the curved passageway to couple the interior of the curved passageway with the interior volume of the container;
    an unrestricted second opening located at the second end of the curved passageway to couple the interior of the curved passageway with the exterior of the container and the second opening being sufficiently large to permit the pouring of the liquid out of the container;
    a first curve located between the first end and the second end of the curved passageway and defining a two dimensional curved centerline within the curved passageway, the two dimensional curved centerline lying on a first plane which is substantially vertical with respect to the horizontal surface;
    a second axis perpendicular to the first plane which defines a pivot for rotating the first plane, wherein the first plane is defined to be rotating in a counter-clockwise direction when the first plane is rotating about the second axis such that the first opening is rotated toward the second opening along the two dimensional curved centerline while the first plane remains substantially vertical with respect to the horizontal surface;
    the curved passageway being configured to determine the start-to-pour angle between the base and the horizontal surface at which outside air starts to enter the interior volume of the container and the liquid inside the container starts to flow out of the second opening of the curved passageway when the container is rotated in the counter-clockwise direction, the curved passageway being further configured such that if the base is rotated relative to the horizontal surface at an angle less than the start-to-pour angle when the container is rotated in the counter-clockwise direction, outside air can not enter the interior volume of the container and the liquid in the container does not pour out of the second opening of the curved passageway even if the level of the liquid inside the container is higher than the second opening of the curved passageway;

where the start-to-pour angle is greater than 45 degrees and less than 180 degrees.

14. The spill-resistant container of claim 13 wherein the body forms a rectangularly shaped container.

15. The spill-resistant container of claim 13 wherein the body forms a spherically, elliptically, or other irregularly shaped container.

16. The spill-resistant container of claim 13 wherein the container is semi-rigid.

17. The spill-resistant container of claim 13 wherein the start-to-pour angle is between approximately 90 degrees and 180 degrees, but less than 180 degrees.

18. The spill-resistant container of claim 13 wherein the start-to-pour angle is approximately 90 degrees.

19. The spill-resistant container of claim 13 wherein as the container is rotated and the liquid starts to flow from the first opening toward the second opening, a partial vacuum is created inside the container which establishes the start-to-pour angle at which outside air starts to enter the interior volume of the container and the liquid starts to flow out of the second opening of the curved passageway.

20. The spill-resistant container of claim 13 wherein the curved passageway includes a second curve.

21. The spill-resistant container of claim 20 wherein the second curve is located between the first curve and the first opening.

22. The spill-resistant container of claim 13 wherein at least a portion of the neck is detachable from the container.

23. A curved neck for converting a liquid-storage container having an opening into a spill-resistant container, the container having a base configured to rest on a horizontal surface, the curved neck comprising:

a neck body defining a curved passageway having a first end plane, a second end plane and a first curve located between the first end plane and the second end plane;

a first opening located at the first end plane of the curved passageway;

a connector located at the first end plane of the curved passageway which permits the first opening of the curved passageway to be sealingly connected to the opening of the container;

an unrestricted second opening located at the second end plane of the curved passageway and being sufficiently large to permit the pouring of the liquid out of the container;

when the curved neck is connected to the container to form a spill-resistant container, the curved passageway determines an angle wherein if the container is rotated equal to the angle, the liquid starts to pour out of the second opening of the curved passageway; if the container is rotated more than the angle, the liquid inside the container flows out of the second opening of the curved passageway, and if the container is rotated less than the angle, the liquid does not pour out of the second opening of the curved passageway even if the distance between the level of the liquid inside the container and the horizontal surface exceeds the distance between the second opening and the horizontal surface;

where the angle is greater than 45 degrees and less than 180 degrees.

24. The curved neck of claim 23 wherein the connector is sealingly mateable to the opening of the container.

25. The curved neck of claim 23 wherein the connector is permanently attachable to the opening of the container.

26. The curved neck of claim 23 wherein the curved passageway includes two curves.

27. The curved neck of claim 23 wherein the angle is greater than approximately 90 degrees and less than 180 degrees.

28. A spill-resistant container for a liquid comprising:

a body having a base and an axis that intersects the base, the body defining an interior volume around the axis in the container for storing a liquid such that the container has an upright position when the base is parallel to a horizontal surface and the container has a start-to-pour position when the base is tilted at a start-to-pour angle from the horizontal surface;

a neck located at a first portion of the body and defining a bent passageway having a first end and a second end;

a first opening located at the first end of the bent passageway to couple the bent passageway with the interior volume of the container;

an unrestricted second opening located at the second end of the bent passageway to couple the bent passageway with the exterior of the container and the second opening being sufficiently large to permit the pouring of the liquid out of the container;

a first bend located between the first end and the second end of the bent passageway;

the bent passageway having a bent centerline inside the bent passageway extending from the first opening through the first bend to the second opening of the bent passageway, the distance between the bent centerline and the base stays the same or increasing along the bent passageway starting from the first opening through the first bend to the second opening;

the bent passageway further being configured to determine the start-to-pour angle between the base and the horizontal surface at which the liquid inside the container starts to flow out of the second opening of the bent passageway;

where the start-to-pour angle is greater than 45 degrees and less than 180 degrees; and wherein the bent passageway is configured such that if the base is tilted from the horizontal surface at an angle less than the start-to-pour angle, the liquid does not pour out of the second opening of the bent passageway even if the level of the liquid in the container is higher than the bent centerline.

29. The spill-resistant container of claim 28 wherein the start-to-pour angle is between approximately 90 degrees and 180 degrees, but less than 180 degrees.

30. The spill-resistant container of claim 28 wherein the start-to-pour angle is approximately 90 degrees.

31. The spill-resistant container of claim 28 wherein the bent passageway includes a second bend.

32. The spill-resistant container of claim 28 wherein the first bend having an apex and the distance between the base and a point of the bent centerline of the bent passageway increasing or remaining the same as the point travels from the first opening to the apex of the first bend.

* * * * *